(12) United States Patent
Tsubota et al.

(10) Patent No.: US 7,980,598 B2
(45) Date of Patent: Jul. 19, 2011

(54) PIPE JOINT LOCKING DEVICE

(75) Inventors: Kenji Tsubota, Osaka (JP); Michio Yamaji, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 268 days.

(21) Appl. No.: 12/085,578

(22) PCT Filed: Oct. 11, 2006

(86) PCT No.: PCT/JP2006/320253
§ 371 (c)(1),
(2), (4) Date: May 28, 2008

(87) PCT Pub. No.: WO2007/066452
PCT Pub. Date: Jun. 14, 2007

(65) Prior Publication Data
US 2009/0302598 A1    Dec. 10, 2009

(30) Foreign Application Priority Data
Dec. 7, 2005  (JP) .................................. 2005-352883

(51) Int. Cl.
*F16L 35/00*       (2006.01)
*F16K 35/00*       (2006.01)
(52) U.S. Cl. .............. 285/80; 285/45; 285/81; 285/420; 70/178; 70/180; 70/232
(58) Field of Classification Search .................... 285/45, 285/80, 81, 420; 70/18, 164, 175–180, 232
See application file for complete search history.

(56) References Cited

U.S. PATENT DOCUMENTS 619,795 A * 2/1899 Schreiner ........................ 70/232

(Continued)

FOREIGN PATENT DOCUMENTS

GB         2162606         2/1986

(Continued)

OTHER PUBLICATIONS

International Search Report mailed Dec. 12, 2006, issued on PCT/JP2006/320253.

*Primary Examiner* — James M Hewitt
(74) *Attorney, Agent, or Firm* — Edwards Angell Palmer & Dodge LLP

(57) ABSTRACT

A pipe joint locking device which prevents accidental loosening of a pipe joint after tightening and with which a sealing property of a seal portion of the pipe joint is not impaired even if a force for rotating a pipe member acts on the pipe member. The device is formed of: a first component member 11 including a mounting portion 21 to be mounted to a joint member 2 having an external thread while prevented from relative rotation, a cover portion 22 to be brought into contact with an outer peripheral face of a cap nut 5 from a lower side, and a coupling portion 23 to be brought into contact with a pipe member 3 from the lower side; and a second component member 12 including a cover portion 31 to be brought into contact with the outer peripheral face of the cap nut 5 from an upper side and a coupling portion 32 to be brought into contact with the pipe member 3 from the upper side. The coupling portion 23 of the first component member 11 and the coupling portion 32 of the second component member 12 are coupled to be fixed to a portion 3*a* of the pipe member 3 protruding from the cap nut 5.

4 Claims, 4 Drawing Sheets

U.S. PATENT DOCUMENTS

| | | | | |
|---|---|---|---|---|
| 968,759 | A * | 8/1910 | Fogg | 292/307 B |
| 994,409 | A * | 6/1911 | Kelly | 70/178 |
| 1,365,477 | A * | 1/1921 | Gabriel et al. | 292/307 A |
| 1,678,955 | A * | 7/1928 | Rockenbauer | 292/307 B |
| 1,973,658 | A * | 9/1934 | Redding | 285/30 |
| 2,048,424 | A * | 7/1936 | Caldwell | 70/232 |
| 2,565,659 | A * | 8/1951 | Kontra | 70/232 |
| 3,367,358 | A * | 2/1968 | Rentschler | 137/375 |
| 4,134,279 | A * | 1/1979 | Ross et al. | 70/18 |
| 4,377,178 | A * | 3/1983 | Thompson | 137/385 |
| 4,458,923 | A * | 7/1984 | Burroughs | 285/8 |
| 4,530,522 | A * | 7/1985 | Walker et al. | 285/91 |
| 4,826,215 | A * | 5/1989 | Sullivan | 285/80 |
| 5,222,768 | A * | 6/1993 | Hofer et al. | 285/39 |
| 5,312,139 | A | 5/1994 | Marks et al. | |
| 5,350,201 | A | 9/1994 | Bynum | |
| 5,466,014 | A * | 11/1995 | Cummings | 285/92 |
| 5,490,693 | A * | 2/1996 | Fisher et al. | 285/92 |
| 5,524,936 | A * | 6/1996 | Barr et al. | 285/39 |
| 5,806,555 | A * | 9/1998 | Magno, Jr. | 137/385 |
| 6,139,068 | A * | 10/2000 | Burress et al. | 285/92 |
| 6,152,161 | A * | 11/2000 | Yokota et al. | 137/38 |
| 6,871,518 | B2 * | 3/2005 | Olsen et al. | 70/176 |
| 7,427,083 | B2 * | 9/2008 | Pina et al. | 285/23 |
| 7,628,428 | B2 * | 12/2009 | Rampton et al. | 285/45 |
| 2002/0130518 | A1 * | 9/2002 | Thomas et al. | 285/420 |
| 2003/0020275 | A1 * | 1/2003 | Shoen | 285/80 |
| 2003/0127849 | A1 * | 7/2003 | Workman et al. | 285/80 |

FOREIGN PATENT DOCUMENTS

| | | |
|---|---|---|
| JP | 53-105718 | 9/1978 |
| JP | 57-198489 | 12/1982 |
| JP | 05-071677 | 3/1993 |
| JP | 08-105580 | 4/1996 |

* cited by examiner

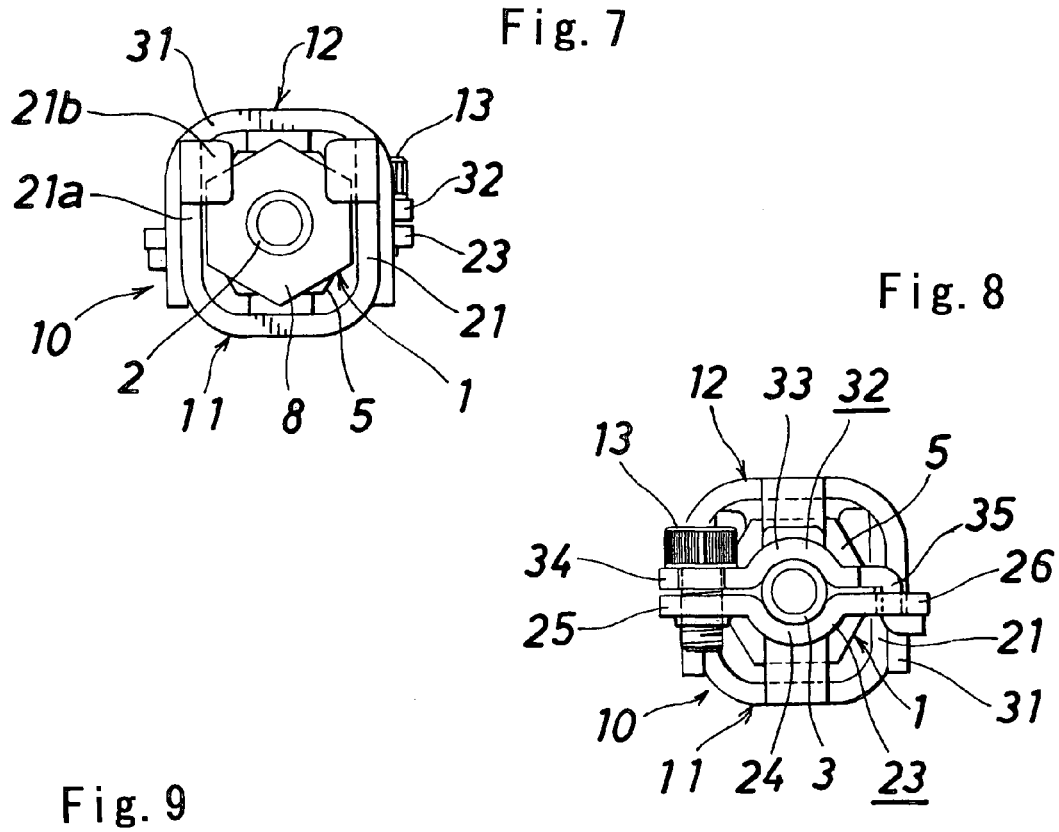

PIPE JOINT LOCKING DEVICE

BACKGROUND OF THE INVENTION

1. Field of the Invention

The present invention relates to a pipe joint locking device for preventing accidental loosening of a pipe joint after tightening.

2. Description of the Related Art

In a pipe joint, a joint member having an internal thread (cap nut) is tightened onto a joint member having an external thread and, as a result, the joint member having the external thread and a pipe member are connected while facing each other through a seal portion. As a locking device (locking clamp) for preventing accidental loosening of the pipe joint after tightening, there is a device, as disclosed in Patent Document 1, formed of: a first clamping member including mounting portions to be mounted while prevented from relative rotation to engaging portions (wrench flats) provided to a joint member having an external thread and a coupling portion provided to be contiguous with the mounting portions and to be brought into contact with an outer peripheral face of the joint member having the internal thread from one side, and a second clamping member having a coupling portion to be brought into contact with the outer peripheral face of the joint member having the internal thread from the other side, the coupling portion of the first clamping member and the coupling portion of the second clamping member being coupled through the joint member having the internal thread.

Patent Document 1: Japanese Unexamined Patent Publication No. 8-105580

SUMMARY OF THE INVENTION

With the pipe joint locking device in the above Patent Document 1, rotation of the cap nut with respect to the engaging portion of the joint member having the external thread is prevented. However, rotation and twist of the pipe member with respect to the joint member having the external thread are not taken into consideration at all. Therefore, if a force for rotating the pipe member acts on the pipe member, the pipe member is rotated or twisted while the seal portion is disposed between the joint member having the external thread and the pipe member and, as a result, the sealing property is impaired.

It is an object of the present invention to provide a pipe joint locking device which prevents accidental loosening of a pipe joint after tightening and with which a sealing property of a seal portion of the pipe joint is not impaired even if a force for rotating a pipe member acts on the pipe member.

According to the present invention, there is provided a pipe joint locking device for preventing accidental loosening of a pipe joint after tightening, the pipe joint connected by tightening a joint member having an internal thread over a joint member having an external thread in a state in which the joint member having the external thread and a pipe member face each other via a seal portion, wherein the device including: a first component member including a mounting portion to be mounted to the joint member having the external thread while prevented from relative rotation, a cover portion provided to be contiguous with the mounting portion and to be brought into contact with an outer peripheral face of the joint member having the internal thread from one side, and a coupling portion provided to be contiguous with the cover portion and to be brought into contact from the one side with a portion of the pipe member protruding from the member having the internal thread; and a second component member including a cover portion to be brought into contact with the outer peripheral face of the joint member having the internal thread from the other side and a coupling portion provided to be contiguous with the cover portion and to be brought into contact from the other side with the portion of the pipe member protruding from the joint member having the internal thread, and the coupling portion of the first component member and the coupling portion of the second component member are coupled to be fixed to the portion of the pipe member protruding from the joint member having the internal thread.

The pipe joint is formed of a body as the joint member having the external thread, a sleeve having a flange as the pipe member to butt the body through the seal portion (e.g., gasket), and a cap nut as the joint member having the internal thread to be fitted over the outer periphery of the sleeve and fitted over the body by screwing, for example. There are also other known pipe joints having various structures. The pipe joint locking device according to the present invention can be applied to any of the various pipe joints by adapting the structure of the mounting portion to the pipe joint to which the device is to be applied ("mounting" includes "fitting" and "fixing" in the present invention).

For example, a pipe may be fixed by welding to an end portion of the joint member having the external thread on an opposite side from the end face to butt the pipe member or a main body having a passage of a fluid control apparatus such as a valve may be fixed to the end portion of the joint member having the external thread on the opposite side from the end face to butt the pipe member. In the former case, the joint member having the external thread is normally formed on its outer periphery with an engaging portion with which a spanner or a wrench can be engaged. The mounting portion of the first component member is preferably formed in a substantially U-shape to be engaged with the engaging portion. In the latter case, the mounting portion may be a plate-shaped body to be brought into contact with a bottom face of the valve main body and fixed to the valve main body by a screw, though it is not absolute necessity. In both cases, in a state in which the locking device is mounted, rotation of the joint member having the internal thread with respect to the joint member having the external thread is prevented and rotation of the pipe member with respect to the joint member having the external thread when an external force acts on the pipe member is prevented.

The coupling portion of the first component member may be formed of: a half cylinder portion to be brought into contact with the pipe member from one side; a screw hole portion contiguous with one side of the half cylinder portion and formed with a screw hole into which a coupling bolt is screwed; and a through hole portion contiguous with the other side of the half cylinder portion and formed with a lug-engaging through hole, and the coupling portion of the second component member may be formed of: a half cylinder portion to be brought into contact with the pipe member from the other side; a bolt insertion portion contiguous with one side of the half cylinder portion and formed with a bolt insertion hole into which the coupling bolt is inserted; and an engaging lug contiguous with the other side of the half cylinder portion and having a tip end portion to be detachably fitted for turning in the lug-engaging through hole of the coupling portion of the first component member.

Moreover, the coupling portion of the first component member may be formed of: a half cylinder portion to be brought into contact with the pipe member from one side; and screw hole portions respectively contiguous with opposite sides of the half cylinder portion and formed with screw holes into which coupling bolts are screwed, and the coupling portion of the second component member may be formed of: a half cylinder portion to be brought into contact with the pipe member from the other side; and bolt insertion portions respectively contiguous with opposite sides of the half cylinder portion and formed with bolt insertion holes into which the coupling bolts are inserted.

EFFECTS OF THE INVENTION

According to the pipe joint locking device of the present invention, the first component member including the mounting portion to be mounted to the joint member having the external thread while prevented from relative rotation and the cover portion provided to be contiguous with the mounting portion and to be brought into contact with the outer peripheral face of the joint member having the internal thread from one side and the second component member including the cover portion to be brought into contact with the outer peripheral face of the joint member having the internal thread from the other side are coupled through the coupling portions of the respective component members. Therefore, it is impossible to rotate the joint member having the internal thread with respect to the joint member having the external thread and accidental loosening of the pipe joint after tightening is prevented. Furthermore, the first component member is not rotatable with respect to the joint member having the external thread and the coupling portion of the first component member and the coupling portion of the second component member are coupled to be fixed to the portion of the pipe member protruding from the member having the internal thread. Therefore, rotation of the pipe member with respect to the joint member having the external thread is prevented. Even when a force for rotating the pipe member acts on the pipe member, the force does not affect the seal portion disposed between the joint member having the external thread and the pipe member, faulty sealing caused by a twist after piping installation can be avoided, and the pipe joint can retain its sealing property.

BRIEF DESCRIPTION OF THE DRAWINGS

FIG. 7 is a right side view showing the state.

FIG. 8 is a left side view showing the state.

FIG. 9 is a vertical sectional view showing an example of the pipe joint to which the pipe joint locking device according to the present invention is applied.

Figure 1:
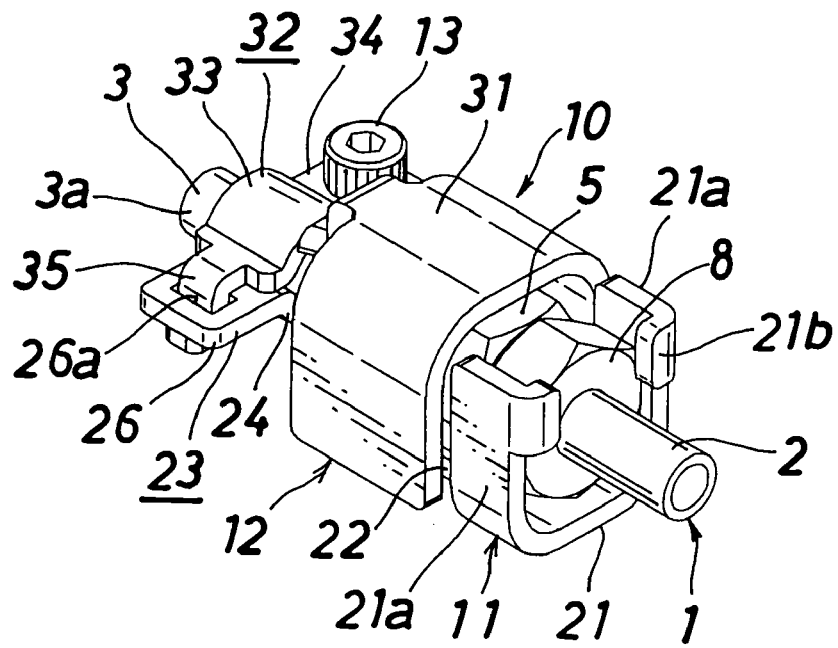
FIG. 1 is a perspective view showing a state in which a pipe joint locking device according to the present invention is mounted to a pipe joint.

EXPLANATION OF REFERENCE NUMERALS (1) pipe joint
(2) first pipe-shaped joint member (joint member having external thread)
(2a) engaging portion
(3) second pipe-shaped joint member (pipe member)
(3a) portion protruding from a member having internal thread
(4) gasket (seal portion)
(5) cap nut (joint member having internal thread)
(10) pipe joint locking device
(11) first component member
(12) second component member
(13) coupling bolt
(21) mounting portion
(22) cover portion
(23) coupling portion
(24) half cylinder portion
(25a) screw hole
(25) screw hole portion
(26) through hole portion
(26a) lug-engaging through hole
(31) cover portion
(32) coupling portion
(33) half cylinder portion
(34) bolt insertion portion
(34a) bolt insertion hole
(35) engaging lug

BEST MODE FOR CARRYING OUT THE INVENTION

An embodiment of the present invention will be described below with reference to the drawings.

FIG. 9 shows an example of a pipe joint to which a pipe joint locking device of the present invention is applied. In this drawing, the pipe joint (1) is formed of a first pipe-shaped joint member (joint member having an external thread) (2), a second pipe-shaped joint member (pipe member) (3), an annular gasket (seal portion) (4) disposed between a left end face of the first pipe-shaped joint member (2) and a right end face of the second pipe-shaped joint member (3), a cap nut (joint member having an internal thread) (5) fitted by screwing over the first pipe-shaped joint member (2) from the second pipe-shaped joint member (3) side, a retainer (6) for retaining the gasket (4) and retained by the first pipe-shaped joint member (2), and a thrust ring (7) disposed between a top wall of the cap nut (5) and a flange portion of the second pipe-shaped joint member (3). The end faces of the respective joint members (2), (3) to butt each other are respectively formed with gasket retaining annular protrusions (2a), (3a).

The first pipe-shaped joint member (2) is formed with an engaging portion (8) in a shape of a short hexagonal column. By holding the engaging portion (8) with a wrench or the like and rotating and tightening the cap nut (5) over the first pipe-shaped joint member (2), the first pipe-shaped joint member (2) and the second pipe-shaped joint member (3) are coupled in a fluid-tight manner.

Although there are various types of pipe joints (1), what they have in common is that the joint member (2) having the external thread and the pipe member (3) are connected while facing each other through the seal member (4) by tightening the joint member having the internal thread (normally, the cap nut) (5) over the joint member (2) having the external thread.

The pipe joint locking device (10) of the present invention is a locking device for preventing accidental loosening of the pipe joint (1) after tightening and is formed of a first component member (11) fitted over the joint member (2) having the external thread while being prevented from relative rotation and a second component member (12) detachably mounted to the first component member (11), capable of turning with respect to the first component member (11) before it is tightened with a coupling bolt (13), and fixed to the first component member (11) when it is tightened with the coupling bolt (13).

Figure 2:
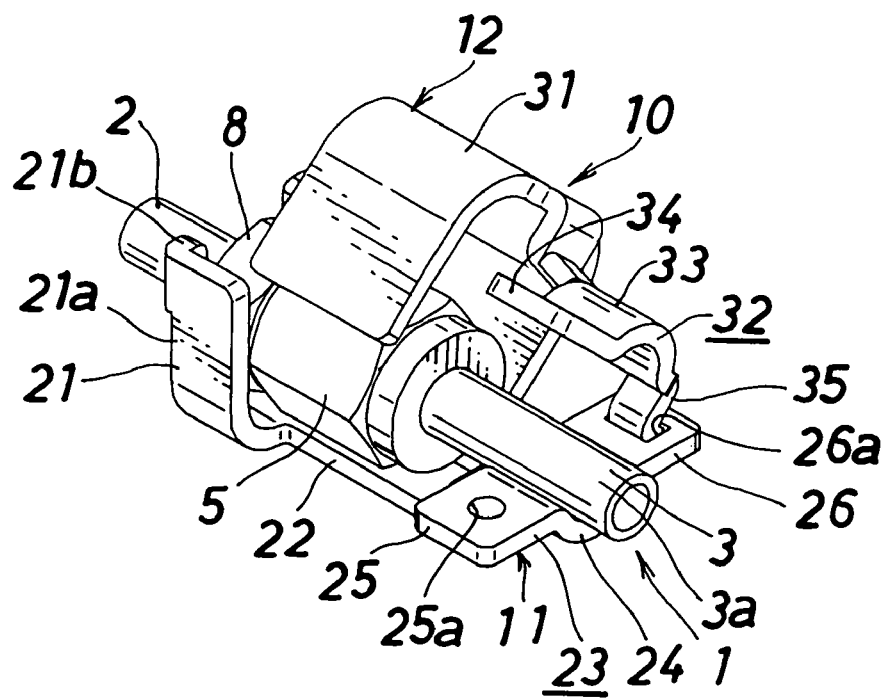
FIG. 2 is a perspective view showing a state during mounting of the pipe joint locking device according to the present invention to the pipe joint.
Figure 3:
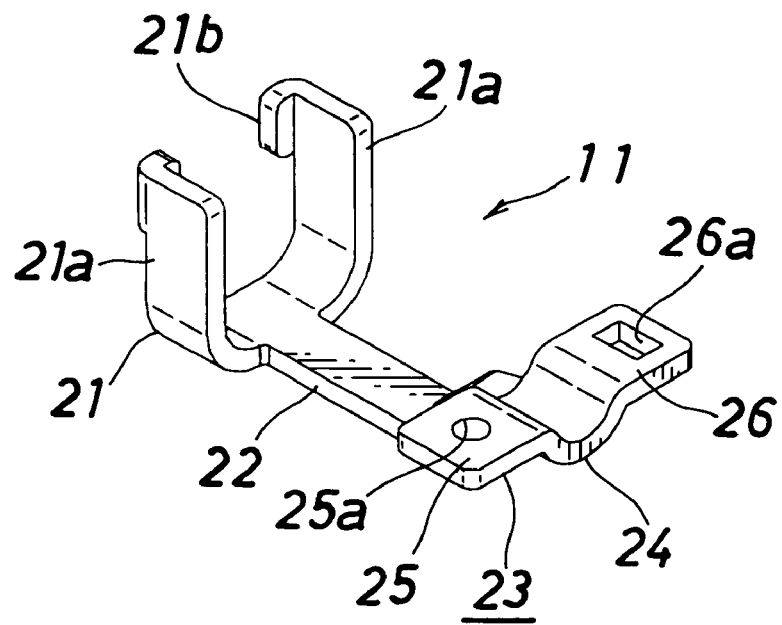
FIG. 3 is a perspective view showing a first component member forming the pipe joint locking device.
Figure 4:
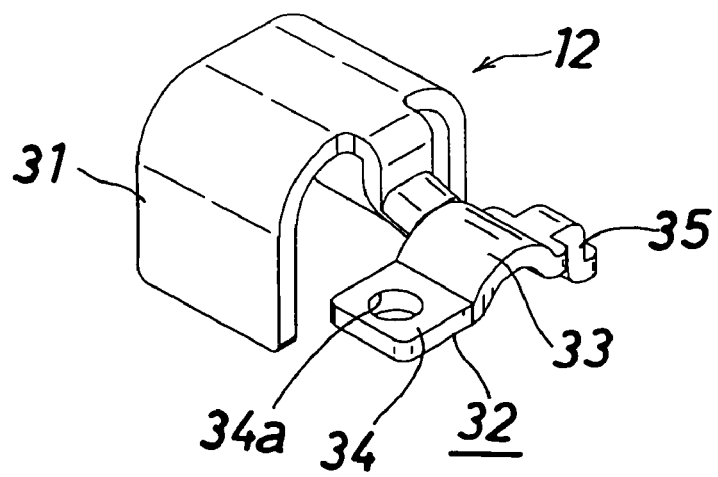
FIG. 4 is a perspective view showing a second component member forming the pipe joint locking device.
Figure 5:
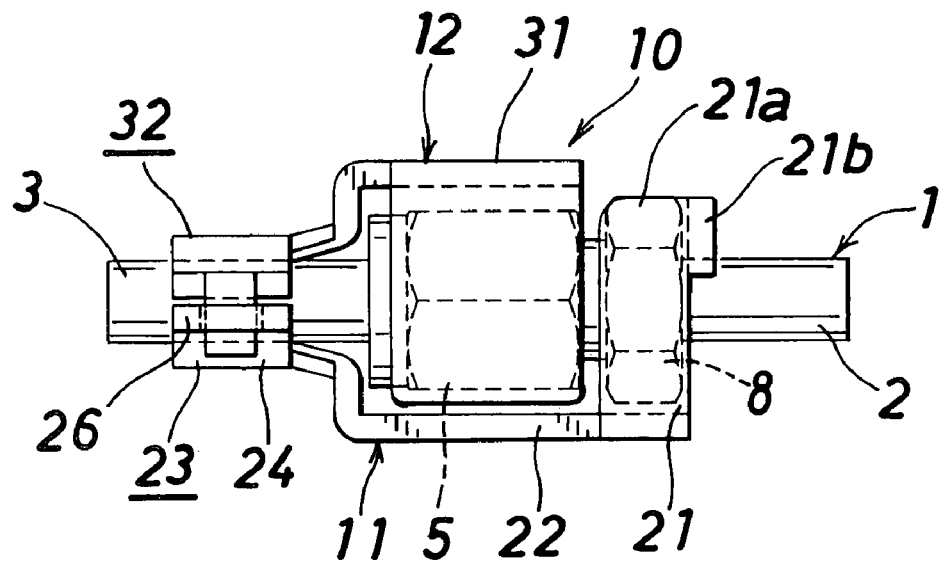
FIG. 5 is a front view showing a state in which the pipe joint locking device according to the present invention is mounted to the pipe joint.
Figure 6:
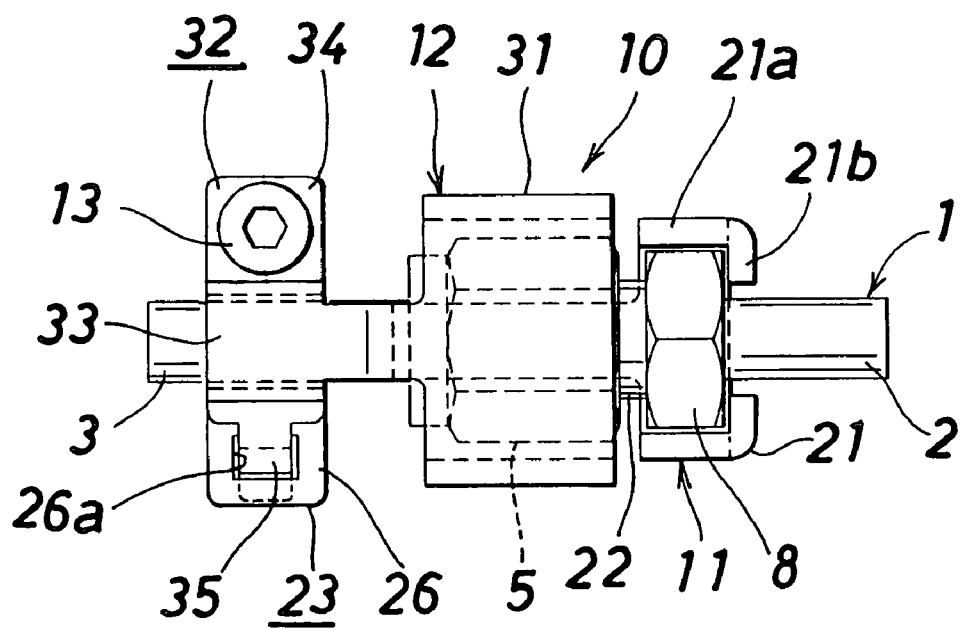
FIG. 6 is a plan view showing the state.

FIG. 1 is a perspective view showing a state in which the pipe joint locking device (10) is mounted to the pipe joint (1) FIG. 2 is a perspective view showing a state which is before tightening with the coupling bolt (13) and in which the second component member (12) can turn with respect to the first component member (11). FIG. 3 is a perspective view showing the first component member (11). FIG. 4 is a perspective view showing the second component member (12). FIGS. 5 to 8 are drawings showing the state in which the pipe joint locking device (10) is mounted to the pipe joint (1), wherein FIG. 5 is a front view (from a left front side of FIG. 1), FIG. 6 is a plan view (from an upper side of FIG. 1), FIG. 7 is a right side view (from a right front side of FIG. 1), and FIG. 8 is a left side view (from a left back side in FIG. 1).

The first component member (11) is formed of a mounting portion (21) to be mounted to the joint member (2) having the external thread while being prevented from relative rotation, a cover portion (22) provided to be contiguous with the mounting portion (21) and to be brought into contact with an outer peripheral face of the cap nut (5) as the joint member having the internal thread from one side (lower side in the drawing), and a coupling portion (23) provided to be contiguous with the cover portion (22) and to be brought into contact with the portion (3a) of the pipe member (3) protruding from the cap nut (5) from one side (lower side in the drawing).

The second component member (12) is formed of a cover portion (31) to be brought into contact with the outer peripheral face of the cap nut (5) from the other side (upper side in the drawing) and a coupling portion (32) provided to be contiguous with the cover portion (31) and to be brought into contact from the other side (upper side in the drawing) with the portion (3a) of the pipe member (3) protruding from the cap nut (5).

The mounting portion (21) of the first component member (11) is formed in a substantially U shape to be engaged with the engaging portion (8) formed on the outer periphery of the joint member (2) having the external thread. An interval between opposed walls (21a), (21a) of the mounting portion (21) is substantially the same as a width between opposed two faces of the cap nut (5) and a height of the opposed walls (21a), (21a) of the mounting portion (21) is substantially the same as a diameter of the cap nut (5). Top portions of the opposed walls (21a), (21a) are formed with bent edge portions (21b) that face the outer peripheral portion of the cap nut (5) in an axial direction.

The cover portion (22) of the first component member (11) is formed in a long and narrow plate shape. On the other hand, the cover portion (31) of the second component member (12) is formed in such an inverted U shape as to be put on the plate-shaped cover portion (22) of the first component member (11) to cover the cap nut (5).

The coupling portion (23) of the first component member (11) is formed of a half cylinder portion (24) to be brought into contact with the pipe member (3) from one side, a screw hole portion (25) contiguous with one side of the half cylinder portion (24) and formed with a screw hole (25a) into which the coupling bolt (13) is screwed, and a through hole portion (26) contiguous with the other side of the half cylinder portion (24) and formed with a lug-engaging through hole (26a).

The coupling portion (32) of the second component member (12) is formed of a half cylinder portion (33) to be brought into contact with the pipe member (3), a bolt insertion portion (34) contiguous with one side of the half cylinder portion (33) and formed with a bolt insertion hole (34a) through which the coupling bolt (13) is inserted, and a hook-shaped engaging lug (35) contiguous with the other side of the half cylinder portion (33) and having a tip end portion to be detachably fitted for turning in the lug-engaging through hole (26a) of the coupling portion (23) of the first component member (11).

To mount the pipe joint locking device (10) to the pipe joint (1), the mounting portion (21) of the first component member (11) is first fitted over the engaging portion (8) of the joint member (2) having the external thread, the engaging lug (35) of the coupling portion (32) of the second component member (12) is then fitted in the lug-engaging through hole (26a) of the coupling portion (23) of the first component member (11) (the state shown in FIG. 2), the second component member (12) is turned with respect to the first component member (11) with the engaging lug (35) engaged in the lug-engaging through hole (26a) to overlay their coupling portions (23), (32) on each other through the pipe member (3) (the state in FIG. 1 but without the coupling bolt (13)), and the coupling portions (23), (32) are fastened to each other with the coupling bolt (13). In this way, the coupling portions (23), (32) are coupled to be fixed to the portion of the pipe member (3) protruding from the cap nut (5).

INDUSTRIAL APPLICABILITY

The present invention provides the pipe joint locking device for preventing accidental loosening of the pipe joint after tightening. The pipe joint is frequently used for piping of an apparatus for supplying fluid such as gas. By using the pipe joint locking device of the present invention, faulty sealing caused by a twist after piping installation can be avoided and the pipe joint can retain its sealing property.

The invention claimed is:

1. A pipe joint locking device preventing accidental loosening of a pipe joint after tightening, the pipe joint connected by tightening a joint member having an internal thread over a joint member having an external thread in a state in which the joint member having the external thread and a pipe member face each other via a seal portion, wherein the device comprises:

a first component member including a mounting portion mounted to the joint member having the external thread while being prevented from relative rotation, a cover portion provided to be contiguous with the mounting portion and brought into contact with an outer peripheral face of the joint member having the internal thread from one side, and a coupling portion provided to be contiguous with the cover portion and brought into contact from the one side with a round portion of the pipe member protruding from the member having the internal thread; and a second component member including a cover portion brought into contact with the outer peripheral face of the joint member having the internal thread from the other side and a coupling portion provided to be contiguous with the cover portion and brought into contact from the other side with the portion of the pipe member protruding from the joint member having the internal thread, and the coupling portion of the first component member and the coupling portion of the second component member are coupled and fixed to the round portion of the pipe member protruding from the joint member having the internal thread, and relative rotation of the pipe member with respect to the joint member having the external thread is prevented even if a rotational force acts on the pipe member.

2. A pipe joint locking device according to claim 1, wherein the mounting portion of the first component member is formed in a substantially U shape to be engaged with an engaging portion provided to an outer periphery of the joint member having the external thread.

3. A pipe joint locking device according to claim 1, wherein the coupling portion of the first component member is formed of: a half cylinder portion brought into contact with the pipe member from one side; a screw hole portion contiguous with one side of the half cylinder portion and formed with a screw hole into which a coupling bolt is screwed; and a through hole portion contiguous with the other side of the half cylinder portion and formed with a lug-engaging through hole, and the coupling portion of the second component member is formed of: a half cylinder portion brought into contact with the pipe member from the other side; a bolt insertion portion contiguous with one side of the half cylinder portion and formed with a bolt insertion hole into which the coupling bolt is inserted; and an engaging lug contiguous with the other side of the half cylinder portion and having a tip end portion to be detachably fitted for turning in the lug-engaging through hole of the coupling portion of the first component member.

4. A pipe joint locking device according to claim 2, wherein the coupling portion of the first component member is formed of: a half cylinder portion brought into contact with the pipe member from one side; a screw hole portion contiguous with one side of the half cylinder portion and formed with a screw hole into which a coupling bolt is screwed; and a through hole portion contiguous with the other side of the half cylinder portion and formed with a lug-engaging through hole, and the coupling portion of the second component member is formed of: a half cylinder portion brought into contact with the pipe member from the other side; a bolt insertion portion contiguous with one side of the half cylinder portion and formed with a bolt insertion hole into which the coupling bolt is inserted; and an engaging lug contiguous with the other side of the half cylinder portion and having a tip end portion to be detachably fitted for turning in the lug-engaging through hole of the coupling portion of the first component member.

* * * * *